Oct. 23, 1956         C. L. BARKER         2,767,924
                   FLUID MIXING DEVICES
Filed March 30, 1955                     4 Sheets-Sheet 1

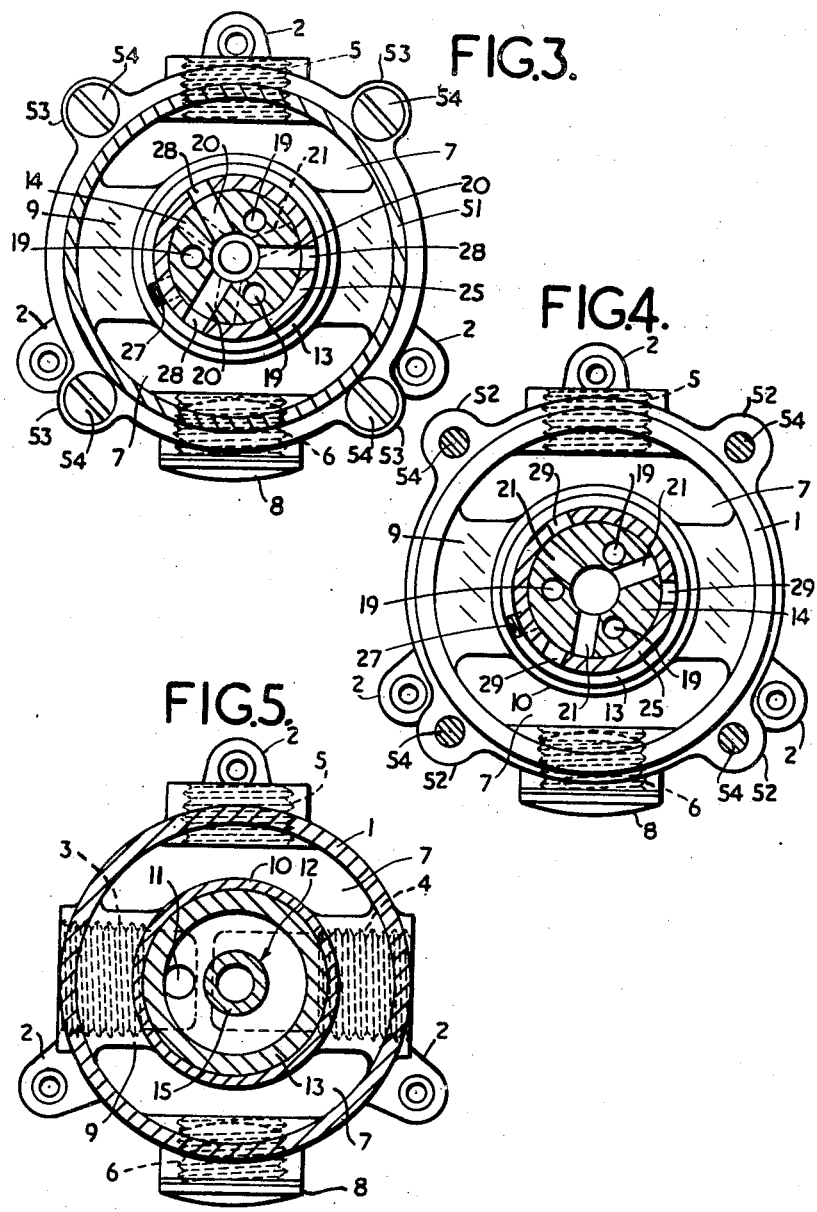

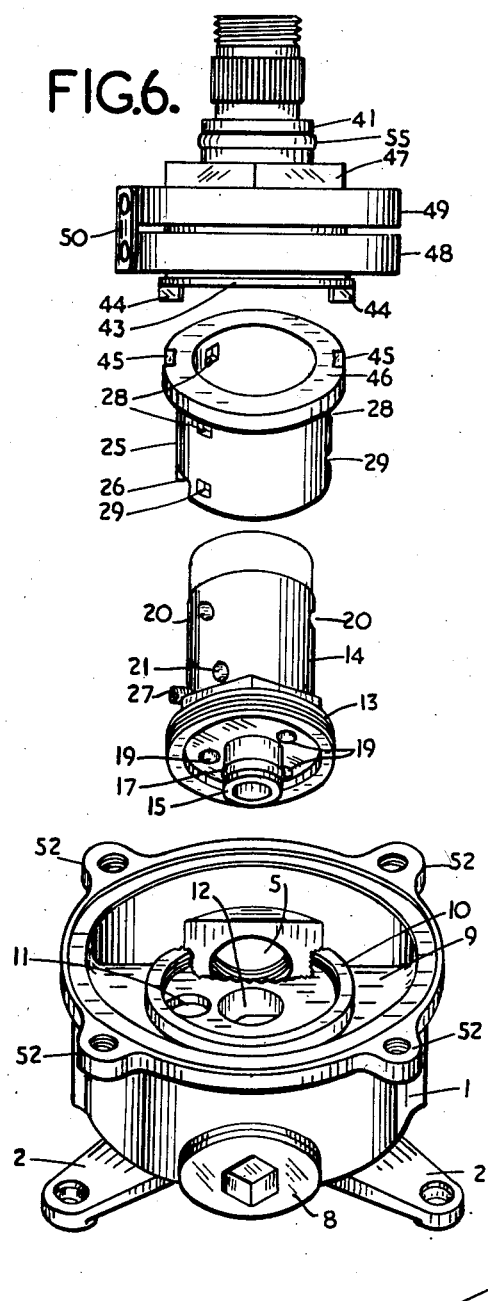

United States Patent Office 2,767,924
Patented Oct. 23, 1956

2,767,924

FLUID MIXING DEVICES

Clifford Lewis Barker, Cheltenham, England, assignor to Walker Crosweller & Company Limited, Cheltenham, England Application March 30, 1955, Serial No. 497,988

Claims priority, application Great Britain March 31, 1954

4 Claims. (Cl. 236—12)

This invention has reference to fluid mixing devices of the kind comprising a valve which is adjustable, under the control of a thermally sensitive unit, to vary the proportions in which two streams of fluid supplied to the device at different temperatures, are mixed so as to provide a mixture at, or substantially at, a constant predetermined temperature, and wherein means are provided to enable the supply of the said streams to be cut off positively, as and when desired.

One object of the invention is to provide a thermostatically controlled fluid mixing device of the above kind in which provision is made for terminating, in a positive manner, the flow of the fluid streams supplied to the device.

Another object of the invention is to provide a mixing device which is efficient in operation and which has a maximum mixture capacity, that is, which is able to deliver a maximum volume of mixture, at a controlled temperature, for any given overall dimensions and any given operating conditions such as the pressures at which the two fluids are supplied.

A further object of the invention is to prevent as far as is practically possible, undesirable seepage of fluid internally, and from the interior to the exterior, of the mixing device.

Another object of the invention is to minimize the costs of manufacture of the mixing device by reducing the number of machine operations necessary to finalize the production of and number of the component parts.

The above and other objects of the invention will become apparent from the following specific description when read in conjunction with the accompanying drawings which illustrate a typical but non-limiting embodiment of the invention.

In the said drawings:

Figures 3–5 are respectively sections along the lines x—x, y—y and z—z of Figure 2, and Figure 6 is an exploded view of certain of the component parts of the device shown in Figures 1 and 2.

Figure 1:
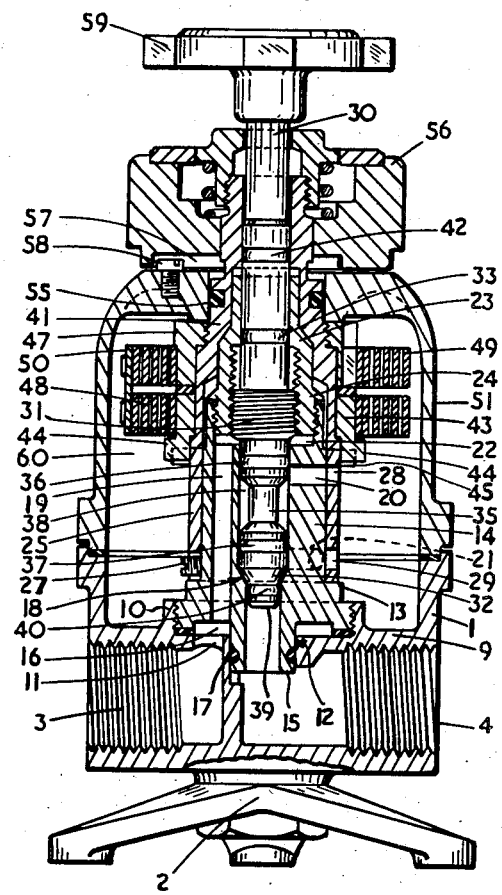
Figure 1 is a sectional elevation showing the relative positions of the component parts of a fluid mixing device when the flow of fluid is cut off.

The fluid mixing device shown in the said drawings comprises a cupped base 1 to the underside of which there is fixed a mounting bracket 2; the said base is formed with two co-axial fluid inlets 3, 4 which are disposed diametrically of the lower part of the said base, the common axis of the said inlets being disposed at right angles to the common axis of two co-axial outlets 5, 6 which are formed in the wall of the base at diametrically opposed positions and open respectively into wells or depressions 7 formed in the base on opposite sides of the inlets (see Figures 3–5 and Figure 6 in which part of the base is broken away to expose the outlet 5).

The inlets and outlets are tapped so that a fluid supply pipe may be connected into each inlet, a mixture discharge pipe may be connected into one of the outlets and a plug or stopper 8 may be connected into and close the other outlet.

When the device is installed for normal use by fixing the bracket 2 upon the surface of a wall or other suitable support, it is intended that a hot water or steam supply pipe shall be connected into the inlet 3, a cold water supply pipe shall be connected into the inlet 4, and the mixture discharge pipe shall be connected into whichever of the two outlets 5 or 6 is the more convenient. Hereinafter, the inlets 3 and 4 will be referred to as the "hot water inlet" and the "cold water inlet" respectively, whereas the term "discharge outlet" will apply to that outlet which is not closed by the plug or stopper 8.

As is shown clearly in the drawings (more particularly in Figure 5), the inlets are formed in and longitudinally of a bridge 9 which is integral with and extends diametrically of the interior of the base between the depressions 7, the cold water inlet being of greater length than the hot water inlet so that it projects beyond the centre of the base. A shallow, circular and tapped cup 10 is formed on the crown of the bridge concentrically within the base, and two transfer ports 11 and 12 extend through the said crown to establish communication between the cup and the hot and cold water inlets respectively, the port 12 also being located concentrically of the base.

A screw-threaded peripheral shoulder 13 formed on one end of a pillar 14 is screw-connected within the mouth of the cup 10 so that the pillar is secured perpendicularly to the crown of the bridge and projects through the mouth of the base. The face of the said shouldered pillar end is formed with a co-axial spigot 15 which enters and makes a close fit within the transfer port 12, and is surrounded by an annular recess 16 so as to ensure that, when the pillar is secured in the cup a clearance is provided between the said spiggoted end face and the floor of the cup. Seepage of water between the contacting walls of the spigot and port 12 is prevented by a compressed rubber or like resilient O-ring 17 accommodated within a groove formed in and around the spigot.

The spigot and pillar are bored axially thereof, the spigot bore being of smaller diameter than the pillar bore and a tapered seating 18 being formed at the restriction thus created at the junction between the said bores; the spigot and pillar bores provide an axial passage which, since the spigot extends through the transfer port 12, opens directly into the cold water inlet. In addition, the pillar is formed with three longitudinal passages 19 which extend from the spigotted end face to the opposite end face of the pillar and are disposed at equi-angular distances apart around the axial pillar passage; each of the said additional passages opens to the annular recess 16 and, therefore, is in constant communication with the hot water inlet through the transfer port 11.

The pillar is also formed with two longitudinally-spaced systems of radial ports, namely a system of three hot water ports 20 and a system of three cold water ports 21. All the radial ports extend from the bore to the periphery of the pillar, the cold water ports being located adjacent the seating 18 and the hot water ports being located adjacent the end of the pillar which projects through the mouth of the base 1 and being offset or staggered relatively to the ports 21. Finally, the end of the pillar which projects through the mouth of the base is formed with a concentric tapped recess 22 which is deeper than the recess 16 and is engaged by a threaded end of a sleeve 23; adjacent its threaded end, the sleeve is provided with a peripheral flange 24 which is located at a distance from the said end which is less than the depth of the recess 22 so that when the sleeve is screwed fully into and is secured within the recess, the said flange 24 seats upon the rim of the said recess and a clearance is created between the adjacent sleeve and pillar faces (see Figures 1 and 2), into which clearance both the axial and additional pillar passages open.

The pillar is surrounded by a sleeve valve 25 of which one end seats and is adapted to rotate upon the shoulder 13 within limits determined by the engagement between a jaw 26 formed in the said valve end (see Figure 6) and a peg 27 projecting radially from the pillar.

The sleeve valve is also formed with two systems of radial ports, namely a system of three hot water ports 28 and a system of three cold water ports 29 which are located respectively in the same transverse planes as the pillar ports 20 and 21. Each hot water port 28 is in alignment, lengthwise of the pillar and sleeve valve, with a corresponding cold water port 29, the ports in each pillar and sleeve system are spaced apart by 120 degrees and the degree of offset or stagger between the ports 20 and 21 is equal to the rotary movement permitted by the engagement of the jaw 26 with the peg 27. Further, each of the ports 28 is adapted to register simultaneously with a corresponding port 20 (see Figures 1, 2 and 3) and when this occurs each port 29 is located wholly to one side of a corresponding port 21 (see Figure 4), whereas, by turning the sleeve valve from one extreme to the other of its limited rotary movement, the ports 21 and 29 are brought simultaneously into register and the ports 28 are taken to positions wherein they are disposed wholly to one side of their corresponding ports 20.

A spindle 30 extends through and projects beyond both ends of the sleeve 23; the spindle is formed with a threaded portion 31 which engages a tapped and larger diameter portion of the sleeve bore, the said spindle portion being of a length considerably less than the said bore portion so that, when rotated, the spindle is also displaced axially relatively to the sleeve, from one extreme position wherein a tapered portion 32 on its end which projects beyond the sleeve into the bore of the pillar, is in contact with the seating 18, to an opposite extreme position wherein the threaded spindle portion contacts the innermost end of the tapped portion of the sleeve bore.

The spindle is a close sliding fit within the remainder and smaller diameter portion of the sleeve bore, and, to prevent seepage of fluid between the spindle and sleeve, the spindle is formed with a peripheral groove wherein a rubber or like resilient O-ring 33 is accommodated and is compressed by the sleeve.

The spindle end which projects into the pillar bore acts as a plug-like, cut-off valve for which purpose it is formed with a reduced diameter portion or neck 35 which is of a length less than the length of the pillar bore portion of the axial passage; the said spindle end or valve is also formed, beyond each end of the said neck, with a peripheral groove, a resilient O-ring 36 being accommodated and compressed within one of the said grooves and another identical O-ring 37 being accommodated and compressed within the other of said grooves so as to prevent seepage of fluid between the valve and passage walls to and from the annular space 38 around the neck.

A boss 39 formed on the extremity of the plug or valve, extends into and makes a sliding fit within the bore of the spigot 15 when the tapered spindle portion 32 contacts the seating 18, the said boss also being formed with a peripheral groove wherein a resilient O-ring 40 is accommodated and compressed to prevent flow of fluid through the spigot bore portion of the axial passage as the boss enters the said bore portion.

The spindle end which projects from the opposite end of the sleeve 23, passes through and beyond and makes a sliding fit within the bore of a tubular shroud 41, an additional resilient O-ring 42 accommodated and compressed within a peripheral groove formed in the said spindle end, preventing the seepage of fluid through the shroud.

The shroud wholly encloses the sleeve 23 and the adjacent cupped end of the pillar, and its rim seats upon the rim of the ported sleeve valve 25. A collar 43 rotatably mounted upon and around the exterior of the said shroud rim, is provided on its edge adjacent the sleeve valve, with two diametrically opposed studs 44 which engage respectively in slots 45 (see Figure 6) formed in a peripheral flange 46 on the said sleeve valve, to enable rotary drive to be transmitted from the collar to the valve.

A second collar 47 disposed around the shroud on the side of the collar 43 remote from the sleeve valve, is screw-connected and therefore fixed relatively to, the said shroud. The collars are surrounded by bimetallic coils 48 and 49 respectively, the innermost turn of each coil being anchored to the corresponding collar and the outermost turns of the two coils being interconnected by a strap 50. Consequently, any rotary movement imparted to the shroud, is transferred through the collar 47, the coils 48, 49, the collar 43 and the studs 44, to the sleeve valve, whereas any variation in the temperature of the coils imparts rotary movement to the sleeve valve through the collar 43 and studs 44.

A domed cover 51 seats, mouth downwards, on the rim of the base 1, and is secured to the base by bolts 54 which engage apertured lugs 52, 53 formed on the base and cover respectively (see Figures 3, 4 and 6). The interior of the cover and base together create a fluid mixing chamber 60 within the device.

The shroud 41 projects through and makes a close fit within an aperture formed in the crown of the cover and a resilient O-ring 55 accommodated and compressed within a groove formed in and around the said shroud, effects a fluid-tight seal between the cover and shroud; the said O-ring also ensures that the shroud is not rotatable by the coils 48, 49 when the latter are subjected to temperature variations, nor by the rotation of the spindle 30.

The shroud is rotatable manually, by a knob 56 which is splined upon the shroud externally of the cover and is formed with an arcuate recess 57 in its face adjacent the cover, the said recess being engaged by the head of a bolt 58 screwed into the cover crown so as to limit the rotary movement that may be imparted to the knob and shroud, and, consequently, prevent the coils being strained by an attempt to drive the sleeve valve beyond the limits of its rotary movement, which limits are determined by the dimensions of the stud-engaged jaw 26.

The spindle is rotatable manually by a handle 59 which is fixed thereto on the opposite side of the knob to the cover.

Figure 2:
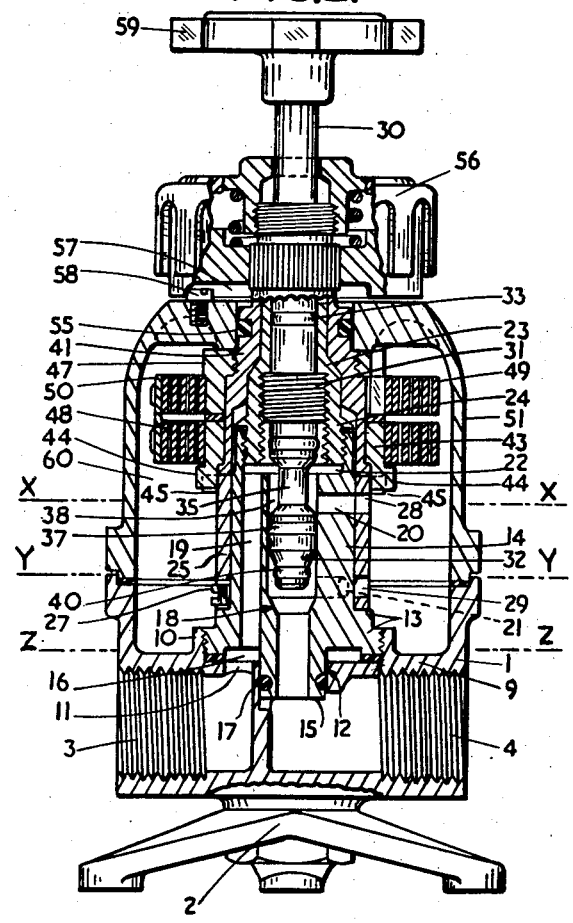
Figure 2 is a similar view to Figure 1 but shows component parts positioned to permit fluid flow.

To terminate the flow of fluid through the mixing device, the spindle is so rotated that it is displaced longitudinally, due to the screw engagement between the spindle portion 31 and the tapped, larger-diameter portion of the bore of the sleeve 23, in the direction which takes the tapered spindle portion into engagement with the seating 18 (as shown in Figure 1). Under such conditions, flow of cold water from the cold water inlet 4 through the bore of the spigot 15 is prevented both by the location of the boss 39 of the cut-off valve within the restricted portion of the axial pillar passage, and by the contact between the spindle and the said seating; also flow of hot water (or steam) from the inlet 3 through the transfer port 11, the clearance 16 and the additional pillar passages 19, is prevented by the location of the O-ring 36 of the said cut-off valve within the said axial passage between the system of radial ports 20 and the clearance 22.

To bring the device into operation, the spindle is so rotated as to cause its longitudinal displacement in the direction which, initially, severs the contact between the tapered spindle portion 32 and the seating 18. As this spindle rotation is continued, the boss 39 moves out of the restricted portion of the axial pillar passage thereby enabling cold water to flow from the inlet 4, into and along the said passage and from the latter to the system of cold water ports 21; the displacement of the spindle also moves the O-ring 37 to a position between the two systems of pillar ports so that the cold water is prevented from gaining access to the hot water ports 20. Provided that the ports 29 are not located wholly to one side of the cold water ports 21, the cold water flows through the port systems 21, 29 into the mixing chamber 60 and then through the unplugged discharge outlet of the device. After the flow of cold water has been initiated in this manner, the O-ring 36 moves out of the axial pillar passage into the sleeve 23, thereby permitting hot water (or steam) to flow from the inlet 3, through the clearance 16, the additional passages 19 and the clearance 22 into the axial passage, and from the latter into the system of ports 20. Provided that the ports 28 are not located wholly to one side of the said ports 20, the hot water flows from the latter through the said ports 28, into the chamber 60 where it is mixed with the cold water before passing to and through the discharge outlet.

The mixture thus produced also flows through the turns of the bimetallic coils 48, 49 and, if it is of a temperature other than that determined by the setting of the knob 56 and indicated by the position of an arrow (not shown) or equivalent marking on the knob relatively to a scale marked upon the cover, the coils impart rotary movement to the sleeve valve 25 so as to increase (or decrease) the degree of overlap between the ports 20 and 28 and decrease (or increase) the degree of overlap between the ports 21 and 29 and thereby vary the relative proportions of the hot water (or steam) and the cold water flowing to the mixing chamber, until the said determined temperature is obtained.

Reversal of the direction of spindle rotation first terminates the flow of the hot water (or steam), then the flow of the cold water and finally re-establishes the contact between the tapered spindle portion and the seating.

The designs of the base 1 and cover 51 are such that both these components are capable of production in the form of die-castings thereby minimising subsequent machining operations and, consequently, manufacturing costs.

It is to be understood that the mixing device described above and illustrated in the drawings, is only a preferred embodiment of the invention, and that various alterations in constructional details, which will be apparent to those skilled in the art, may be made without departing from the scope of the invention as defined in the appended claims; for example, the spindle 30 may be provided with a peripheral flange between the threaded portion 31 and the adjacent end of the pillar which flange is adapted to contact the said pillar end at the same time as the tapered portion 32 contacts the seating 18 so that the flow of hot water (or steam) to the axial passage is also terminated in a positive manner. Also, alternative means may be provided for mounting the pillar upon the crown of the bridge 9; for instance, radial ears extending from the shoulder 13 may seat upon the crown and be secured to the latter by bolts or equivalent fastening expedients. Again, the shroud 41 may terminate within the bimetallic coil 49, the innermost turn of the said coil being anchored directly to the shroud and the drive transmitting collar 43 being rotatably mounted about the recess and sleeve-receiving end of the pillar.

Having thus described my invention, what I claim is:

1. A fluid device wherein two separate fluid inlets and at least one mixture outlet are formed in a base, one of said inlets opening directly to one end of an axial passage formed in a pillar mounted on and concentrically of the base, the other inlet opening to one end of at least one additional passage extending lengthwise of the pillar and communicating with the opposite end of the said axial passage, the pillar being formed with two separate systems of ports which extend respectively from the vicinity of the opposite ends of the axial passage to the pillar periphery, a thermostatically-controlled and ported valve being mounted on and around the pillar to proportion the flow of fluids through the port system to the outlets, and a manually operable cut-off valve being accommodated within and being displaceable lengthwise of the axial passage to control the flow of fluid to the port systems from the opposite ends of said axial passage, said manually operable cut-off valve comprising an axially displaceable plug which is a close sliding fit within the axial pillar passage and is formed, between its ends, with a reduced neck and, beyond each of the said ends, with a peripheral groove in which a resilient ring is inserted and compressed radially when in contact with the passage wall so as to provide a fluid-tight seal between the plug and the passage.

2. A fluid device wherein two separate fluid inlets and at least one mixture outlet are formed in a base, one of said inlets opening directly to one end of an axial passage formed in a pillar mounted on and concentrically of the base, the other inlet opening to one end of at least one additional passage extending lengthwise of the pillar and communicating with the opposite end of the said axial passage, the pillar being formed with two separate systems of ports which extend respectively from the vicinity of the opposite ends of the axial passage to the pillar periphery, a thermostatically-controlled and ported valve being mounted on and around the pillar to proportion the flow of fluids through the port systems to the outlets, and a manually operable cut-off valve being accommodated within and being displaceable lengthwise of the axial passage to control the flow of fluids to the port systems from the opposite ends of said axial passage, said cut-off valve consisting of one end of a spindle which extends axially of the device and is adapted for axial displacement between two extreme positions in one of which the rings are located within the axial passage but on opposite sides of the pillar port systems, and in the other of which one ring is located within the said passage between the said port systems whereas the other ring and the adjacent end of the neck are located beyond that end of the passage with which the or each additional pillar passage is in communication.

3. A fluid device wherein two separate fluid inlets and at least one mixture outlet are formed in a base, one of said inlets opening directly to one end of an axial passage formed in a pillar mounted on and concentrically of the base, the other inlet opening to one end of at least one additional passage extending lengthwise of the pillar and communicating with the opposite end of the said axial passage, the pillar being formed with two separate systems of ports which extend respectively from the vicinity of the opposite ends of the axial passage to the pillar periphery, a thermostatically-controlled and ported valve being mounted on and around the pillar to proportion the flow of fluids through the port systems to the outlets, and a manually operable cut-off valve being accommodated within and being displaceable lengthwise of the axial passage to control the flow of fluids to the port systems from the opposite ends of said axial passage, a tapped sleeve being fixed to and coaxially of the pillar, the spindle extending through and being rotatable within said sleeve and being formed with a threaded portion which engages the tapped sleeve so that rotation of the spindle imparts simultaneous axial movement thereto.

4. A fluid mixing device as claimed in claim 3, wherein the sleeve is enclosed by a shroud which carries the thermally sensitive element and is provided, externally of the device, with a manually operable knob whereby the sleeve valve may be adjusted by drive transmitted through the said element, and wherein the spindle extends through and beyond the said shroud and has an operating handle secured to its outer end.

References Cited in the file of this patent

UNITED STATES PATENTS

| | | |
|---|---|---|
| 2,159,033 | Leonard | May 23, 1939 |
| 2,193,581 | Clokey | Mar. 12, 1940 |
| 2,585,726 | Barker | Feb. 12, 1952 |
| 2,691,487 | Schafranik | Oct. 12, 1954 |